(12) United States Patent
Nayak et al.

(10) Patent No.: US 11,075,827 B1
(45) Date of Patent: Jul. 27, 2021

(54) APPARATUS, SYSTEM, AND METHOD FOR IMPROVING THE EFFICIENCY OF LINK-FAILURE DETECTION

(71) Applicant: Juniper Networks, Inc., Sunnyvale, CA (US)

(72) Inventors: Manoj Nayak, Bangalore (IN); Rafik Puttur, Dakshina Kannada (IN)

(73) Assignee: Juniper Networks, Inc, Sunnyvale, CA (US)

( * ) Notice: Subject to any disclaimer, the term of this patent is extended or adjusted under 35 U.S.C. 154(b) by 105 days.

(21) Appl. No.: 16/546,656

(22) Filed: Aug. 21, 2019

(51) Int. Cl.
*H04L 12/26* (2006.01)
*H04L 12/24* (2006.01)

(52) U.S. Cl.
CPC ...... *H04L 43/0811* (2013.01); *H04L 41/0654* (2013.01); *H04L 43/50* (2013.01)

(58) Field of Classification Search
CPC combination set(s) only.
See application file for complete search history.

(56) References Cited

U.S. PATENT DOCUMENTS

| | | | | |
|---|---|---|---|---|
| 2005/0243823 | A1* | 11/2005 | Griswold | H04L 12/4637 370/389 |
| 2006/0015635 | A1* | 1/2006 | Fernandes | H04L 61/10 709/232 |
| 2009/0245261 | A1* | 10/2009 | Khan | H04L 12/4641 370/395.53 |
| 2015/0055650 | A1* | 2/2015 | Bhat | H04L 45/58 370/390 |
| 2015/0103644 | A1* | 4/2015 | Bharadwaj | H04L 67/34 370/221 |
| 2018/0034722 | A1* | 2/2018 | Gupta | H04L 45/586 |
| 2018/0260292 | A1* | 9/2018 | Wang | G06F 11/2257 |

OTHER PUBLICATIONS

Pallagatti et al., "BFD for VXLAN", URL: https://www.ietf.org/archive/id/draft-spallagatti-bfd-vxlan-06.txt, Internet—Draft, Oct. 13, 2017, pp. 1-9.

* cited by examiner

*Primary Examiner* — Xavier S Wong
(74) *Attorney, Agent, or Firm* — FisherBroyles, LLP

(57) ABSTRACT

A disclosed method may include (1) receiving, via a physical interface of a network device, a hello packet that includes information specific to a fault-detection session established between the physical interface and an additional physical interface of a remote device via a link, (2) identifying, within the information, a plurality of statuses that correspond to a plurality of virtual interfaces partitioned on the additional physical interface of the remote device, (3) determining, based at least in part on the statuses of the virtual interfaces, that the link supporting the fault-detection session established between the physical interface and the additional physical interface has experienced at least a partial failure, and then in response to determining that the link has experienced the at least partial failure, (4) performing a remedial action to address the at least partial failure of the link. Various other apparatuses, systems, and methods are also disclosed.

16 Claims, 6 Drawing Sheets

APPARATUS, SYSTEM, AND METHOD FOR IMPROVING THE EFFICIENCY OF LINK-FAILURE DETECTION

BACKGROUND

Network devices (such as routers and switches) are often used to forward traffic within a network and/or across networks. These network devices may represent and/or form the infrastructure of such networks. In some examples, these network devices may include and/or house various physical interfaces. In such examples, these physical interfaces may each be partitioned into multiple virtual and/or logical interfaces.

In one example, virtual interfaces partitioned on physical interfaces of different network devices may establish fault-detection sessions with one another. For example, a virtual interface partitioned on one physical interface and another virtual interface partitioned on a remote physical interface may establish a Bidirectional Forwarding Detection (BFD) session with one another. As part of this fault-detection session, these virtual interfaces may exchange hello packets to inform each other of their respective statuses.

Unfortunately, this traditional configuration of the communication session may lead to certain deficiencies and/or shortcomings that negatively impact the efficiency of link-failure detection for the virtual interfaces. For example, even though multiple virtual interfaces are partitioned on each of two remote physical interfaces, this traditional configuration of the communication session may call for each pair of virtual interfaces to exchange their own individual hello packets with one another. In this example, the various hello packets exchanged between each pair of virtual interfaces may be processed individually. The burden of generating, transmitting, and/or processing the vast number of hello packets may impair and/or inhibit the performance and/or efficiency of the respective hosts.

The instant disclosure, therefore, identifies and addresses a need for additional and improved apparatuses, systems, and methods for improving the efficiency of link-failure detection.

SUMMARY

As will be described in greater detail below, the instant disclosure generally relates to apparatuses, systems, and methods for probing the status of unreachable virtual interfaces partitioned on remote physical interfaces. In one example, a method for accomplishing such a task may include (1) receiving, via a physical interface of a network device, a hello packet that includes information specific to a fault-detection session established between the physical interface and an additional physical interface of a remote device via a link, (2) identifying, within the information included in the hello packet, a plurality of statuses that correspond to a plurality of virtual interfaces partitioned on the additional physical interface of the remote device, (3) determining, based at least in part on the statuses of the virtual interfaces, that the link supporting the fault-detection session established between the physical interface and the additional physical interface has experienced at least a partial failure, and then in response to determining that the link has experienced the at least partial failure, (4) performing a remedial action to address the at least partial failure of the link.

Similarly, a system that implements the above-identified method may include a physical processor configured to execute various modules stored in memory. In one example, this system may include and/or execute (1) a receiving module that receives, via a physical interface of a network device, a hello packet that includes information specific to a fault-detection session established between the physical interface and an additional physical interface of a remote device via a link, (2) an identification module that identifies, within the information included in the hello packet, a plurality of statuses that correspond to a plurality of virtual interfaces partitioned on the additional physical interface of the remote device, (3) a determination module that determines, based at least in part on the statuses of the virtual interfaces, that the link supporting the fault-detection session established between the physical interface and the additional physical interface has experienced at least a partial failure, and (4) a remedy module that performs a remedial action to address the at least partial failure of the link in response to the determination that the link has experienced the at least partial failure.

Additionally or alternatively, an apparatus that implements the above-identified method may include a physical interface of a network device that is communicatively coupled to an additional physical interface of a remote device via a link. The apparatus may also include a physical processor that is communicatively coupled to the physical interface of the network device. In one example, the physical processor may (1) receive, via the physical interface, a hello packet that includes information specific to a fault-detection session established between the physical interface and the additional physical interface of the remote device via the link, (2) identify, within the information included in the hello packet, a plurality of statuses that correspond to a plurality of virtual interfaces partitioned on the additional physical interface of the remote device, (3) determine, based at least in part on the statuses of the virtual interfaces, that the link supporting the fault-detection session established between the physical interface and the additional physical interface has experienced at least a partial failure, and then (4) perform a remedial action to address the at least partial failure of the link in response to determining that the link has experienced the at least partial failure.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
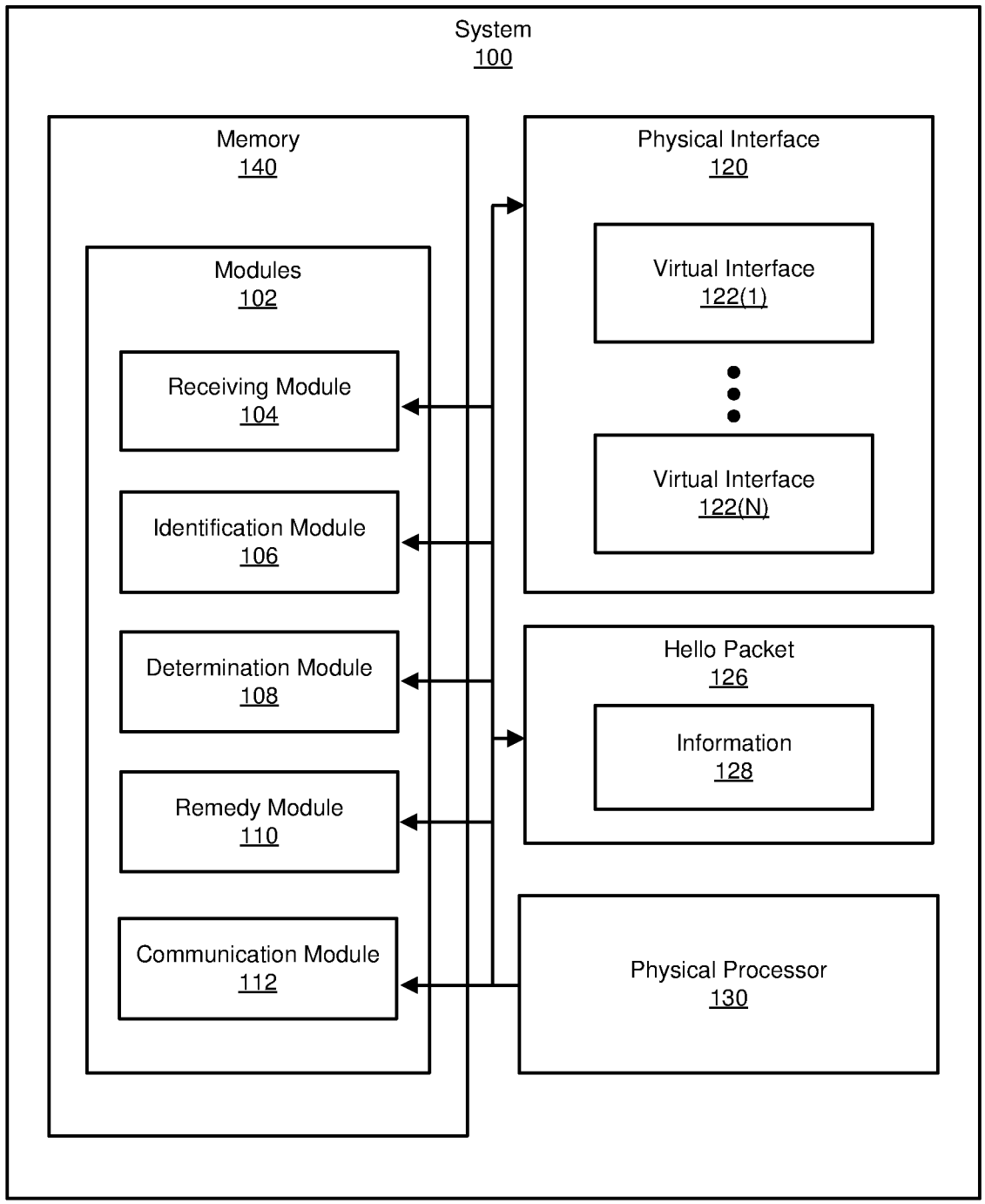
FIG. 1 is a block diagram of an exemplary system for improving the efficiency of link-failure detection.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for improving the efficiency of link-failure detection. As will be explained in greater detail below, embodiments of the instant disclosure may enable physical interfaces to identify, gather, and/or collect the statuses of all their corresponding virtual interfaces. For example, a first set of virtual interfaces may be partitioned on a first physical interface included on a network device. In this example, a second set of virtual interfaces may be partitioned on a second physical interface included on a remote device.

Continuing with this example, one virtual interface partitioned on the first physical interface and one virtual interface partitioned on the second physical interface may establish a BFD session with each other. In addition, another virtual interface partitioned on the first physical interface and another virtual interface partitioned on the second physical interface may also establish a BFD session with each other. Rather than having each virtual interface included in the first set exchange hello packets with their counterparts partitioned on the second physical interface, the first physical interface may identify, gather, and/or collect the statuses of the entire first set of virtual interfaces and then transmit a single hello packet to the second physical interface on behalf of the first set of virtual interfaces. This single hello packet may include, identify, and/or indicate the status of each virtual interface partitioned on the first physical interface.

Similarly, rather than having each virtual interface included in the second set exchange hello packets with their counterparts partitioned on the first physical interface, the second physical interface may identify, gather, and/or collect the statuses of the entire second set of virtual interfaces and then transmit a single hello packet to the first physical interface on behalf of the second set of virtual interfaces. This single hello packet may include, identify, and/or indicate the status of each virtual interface partitioned on the second physical interface.

Accordingly, under this new configuration of BFD technology, hello packets may be exchanged at the physical-interface level, as opposed to the virtual-interface level. As a result, the first and second physical interfaces may be able to transmit and/or process far fewer hello packets, potentially improving the performance and/or efficiency of the respective hosts involved in the BFD session when compared to traditional BFD technology.

Figure 2:
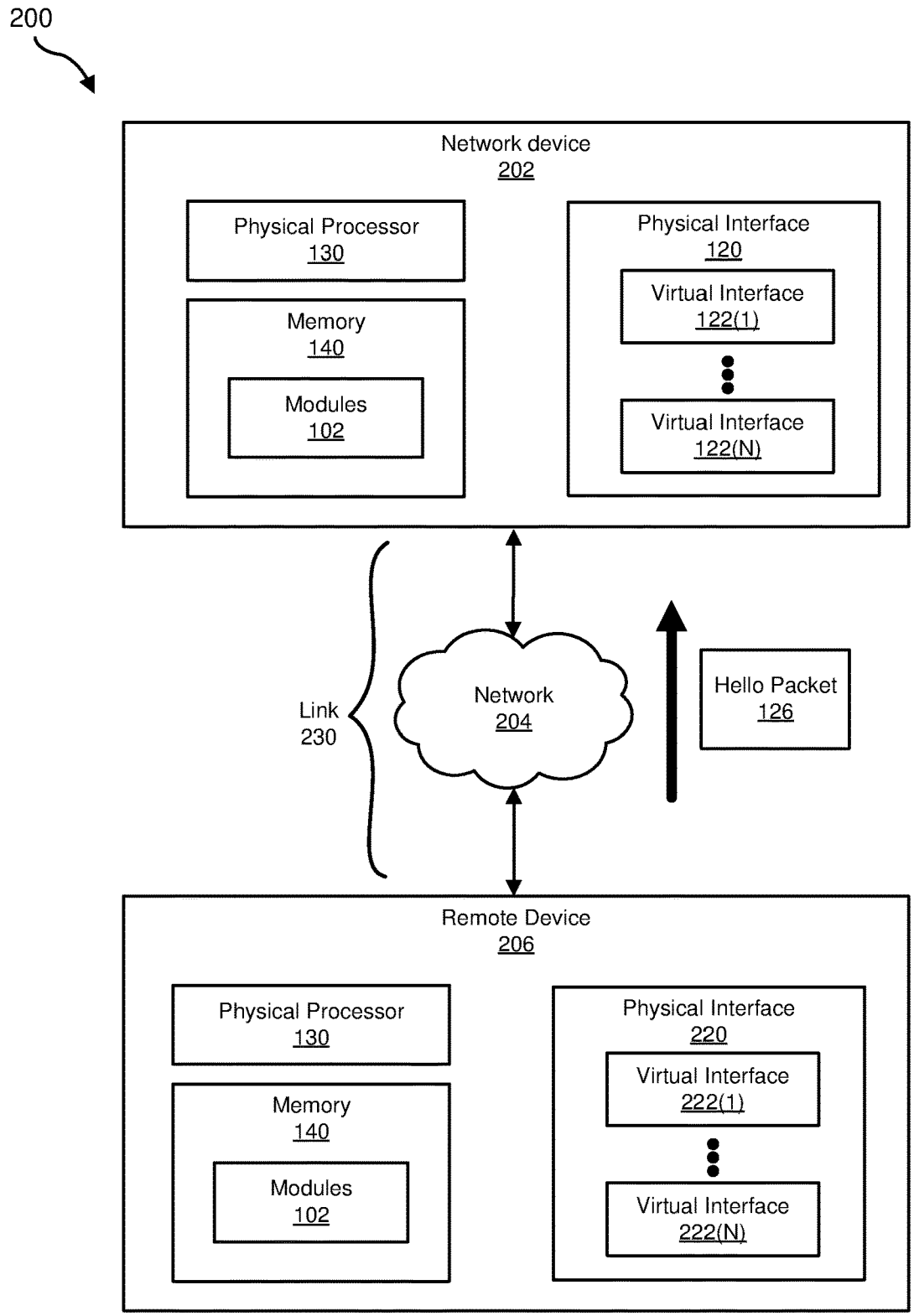
FIG. 2 is a block diagram of an additional exemplary system for improving the efficiency of link-failure detection.
Figure 3:
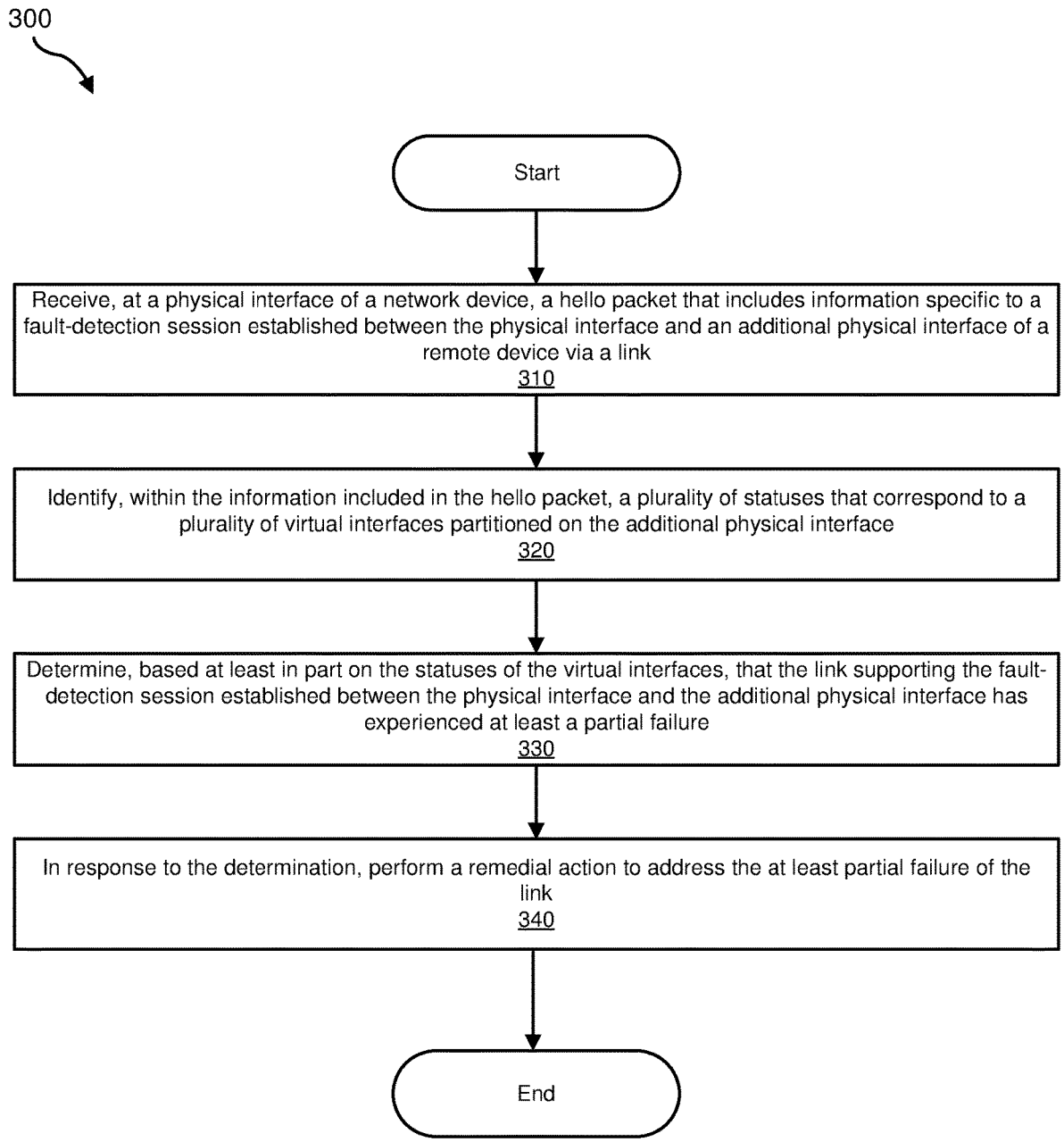
FIG. 3 is a flow diagram of an exemplary method for improving the efficiency of link-failure detection.
Figure 4:
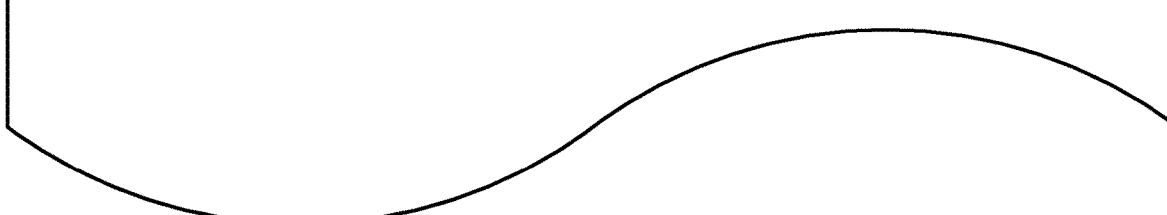
FIG. 4 is an illustration of exemplary information included in a hello packet.
Figure 5:
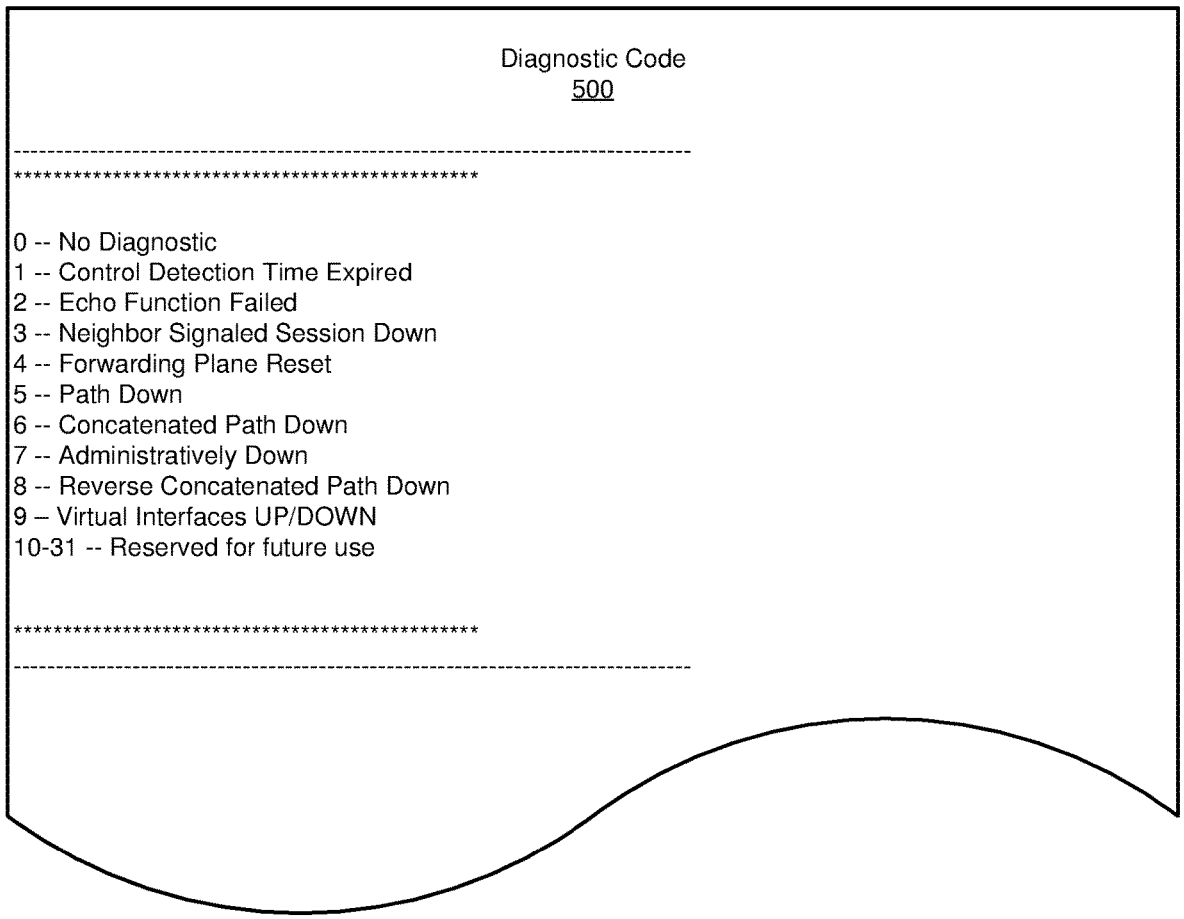
FIG. 5 is an illustration of exemplary diagnostic codes that may be included in the information of a hello packet.

The following will provide, with reference to FIGS. 1, 2, and 4, detailed descriptions of exemplary apparatuses, systems, and corresponding implementations for probing the status of unreachable virtual interfaces partitioned on remote physical interfaces. Detailed descriptions of corresponding computer-implemented methods will be provided in connection with FIG. 3. Detailed descriptions of an exemplary echo request and an exemplary echo reply will be provided in connection with FIGS. 5 and 6. In addition, detailed descriptions of an exemplary computing system for carrying out these methods will be provided in connection with FIG. 6.

FIG. 1 shows an exemplary system 100 that facilitates improving the efficiency of link-failure detection. As illustrated in FIG. 1, system 100 may include one or more modules 102 for performing one or more tasks. As will be explained in greater detail below, modules 102 may include a receiving module 104, an identification module 106, a determination module 108, a remedy module 110, and a communication module 112. Although illustrated as separate elements, one or more of modules 102 in FIG. 1 may represent portions of a single module or application (such as an operating system and/or a BFD application or client).

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., network device 202 and/or remote device 206). One or more of modules 102 in FIG. 1 may also represent all or portions of one or more special-purpose computers configured to perform one or more tasks.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 140. Additionally or alternatively, physical processor 130 may execute one or more of modules 102 to probe the status of unreachable virtual interfaces partitioned on remote physical interfaces. Examples of physical processor 130 include, without limitation, Central Processing Units (CPUs), microprocessors, microcontrollers, Field-Programmable Gate Arrays (FPGAs) that implement soft-core processors, Application-Specific Integrated Circuits (ASICs), portions of one or more of the same, variations or combinations of one or more of the same, and/or any other suitable physical processor.

As illustrated in FIG. 1, exemplary system 100 may further include one or more interfaces, such as a physical interface 120 and/or virtual interfaces 122(1)-(N). In some examples, physical interface 120 may include and/or represent a physical interface that facilitates the flow of traffic within a network and/or across networks. For example, physical interface 120 may include and/or represent a NIC that has direct connections with other interfaces within a network. Additional examples of physical interface 120 include, without limitation, packet forwarding engines, routing engines, Physical Interface Cards (PICS), Flexible PIC Concentrators (FPCs), Switch Interface Boards (SIBS), control boards, communication ports, connector interface panels, line cards, egress interfaces, ingress interfaces, portions of one or more of the same, combinations or variations of one or more of the same, and/or any other suitable interface.

As illustrated in FIG. 1, virtual interfaces 122(1)-(N) may be partitioned on physical interface 120. Accordingly, virtual interfaces 122(1)-(N) may share the infrastructure of physical interface 120 for communication purposes. In some examples, physical interface 120 may be logically divided into virtual interfaces 122(1)-(N). In one example, virtual interfaces 122(1)-(N) may each establish and/or maintain a communication session with an interface included and/or partitioned on a remote device.

As illustrated in FIG. 1, exemplary system 100 may additionally include one or more packets, such as a hello packet 126. In some examples, hello packet 126 may be exchanged between physical interfaces involved in a BFD session. In one example, hello packet 126 may serve to notify a local physical interface of the statuses of virtual interfaces partitioned on a remote physical interface. Accordingly, hello packet 126 may be used to detect link failures that occur between the local physical interface and the remote physical interface. Additionally or alternatively, hello packet 126 may be used to detect link failures that occur between the virtual interfaces partitioned on the local physical interface and the virtual interfaces partitioned on the remote physical interface. Examples of hello packet 126 include, without limitation, BFD control packets, Open Shortest Path First (OSPF) packets, Link Aggregation Control Protocol (LACP) packets, combinations of one or more of the same, and/or any other suitable hello packet.

As illustrated in FIG. 1, hello packet 126 may include and/or represent information 128. Examples of information 128 include and/or identify, without limitation, protocol versions, diagnostic codes, current communication states or conditions, control information, authentication information, packet sizes or lengths, discriminator values, minimum receive or transmits intervals, status indicators for virtual interfaces partitioned on a network interface, combinations of one or more of the same, and/or any other suitable information.

An apparatus for improving the efficiency of link-failure detection may include all or portions of exemplary system 100. In some examples, system 100 in FIG. 1 may be implemented in a variety of ways. For example, all or a portion of exemplary system 100 may represent portions of exemplary system 200 in FIG. 2. As shown in FIG. 2, system 200 may include a network device 202 and a remote device 206 in communication via a link 230. In one example, link 230 may represent part of and/or be include in network 204.

As illustrated in FIG. 2, network device 202 may include and/or represent instances of memory 140, physical processor 130, and/or physical interface 120. Similarly, remote device 206 may also include and/or represent instances of memory 140, physical processor 130, and/or a physical interface 220. In one example, virtual interfaces 222(1)-(N) may be partitioned on physical interface 220. Additionally or alternatively, link 230 may provide connectivity between physical interface 120 of network device 202 and/or physical interface 220 of remote device 206.

In some examples, and as will be described in greater detail below, one or more of modules 102 may cause network device 202 to (1) receive, via physical interface 120, hello packet 126 that includes information 128 specific to a fault-detection session established between physical interface 120 and physical interface 220 of remote device 206 via link 230, (2) identify, within information 128 included in hello packet 126, a plurality of statuses that correspond to virtual interfaces 222(1)-(N) partitioned on physical interface 220 of remote device 206, (3) determine, based at least in part on the statuses of virtual interfaces 222(1)-(N), that link 230 supporting the fault-detection session established between physical interface 120 and physical interface 220 has experienced at least a partial failure, and then (4) perform a remedial action to address the at least partial failure of link 230 in response to determining that link 230 has experienced the at least partial failure.

Network device 202 and remote device 206 each generally represent any type or form of physical computing device capable of reading computer-executable instructions and/or handling network traffic. In one example, network device 202 and/or remote device 206 may include and/or represent routers (such as provider edge routers, hub routers, spoke routers, autonomous system boundary routers, and/or area border routers) that receives, routes, forwards, and/or otherwise handles network traffic. Additional examples of network device 202 and/or remote device 206 include, without limitation, switches, hubs, modems, bridges, repeaters, gateways, multiplexers, network adapters, network interfaces, client devices, laptops, tablets, desktops, servers, cellular phones, Personal Digital Assistants (PDAs), multimedia players, embedded systems, wearable devices, gaming consoles, variations or combinations of one or more of the same, and/or any other suitable network devices.

In some examples, network device 202 and/or remote device 206 may represent intermediate hops along a network path. Accordingly, network device 202 and/or remote device 206 may not necessarily be the initial source and/or final destination of certain traffic. An apparatus for improving the efficiency of link-failure detection may include and/or represent all or a portion of network device 202 or remote device 206.

Network 204 generally represents any medium or architecture capable of facilitating communication or data transfer. In one example, network 204 may include network device 202 and/or remote device 206. Additionally or alternatively, network 204 may include other devices that facilitate communication among network device 202 and/or remote device 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network. Although not illustrated in this way in FIG. 2, network 204 may also include additional devices (such as client devices, servers, network devices, etc.).

FIG. 3 is a flow diagram of an exemplary computer-implemented method 300 for improving the efficiency of link-failure detection. The steps shown in FIG. 3 may be performed by any suitable computer-executable code and/or computing system, including system 100 in FIG. 1, system 200 in FIG. 2, system 600 in FIG. 6, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may receive a hello packet at a physical interface of a network device. For example, receiving module 104 may, as part of network device 202 and/or remote device 206 in FIG. 2, receive hello packet 126 at physical interface 120 of network device 202 via link 230. In this example, hello packet 126 may have originated from or passed through physical interface 220 of remote device 206. As will be described in greater detail below, hello packet 126 may include and/or identify information 128 that is specific to a fault-detection session (such as a BFD session) established between physical interface 120 and physical interface 220.

The systems described herein may perform step 310 in a variety of ways and/or contexts. In some examples, receiving module 104 may monitor physical interface 120 for hello packets. While monitoring physical interface 120 in this way, receiving module 104 may receive hello packet 126 at physical interface 120 as hello packet 126 arrives via link 230.

In some examples, communication module 112 may establish the fault-detection session between physical interfaces 120 and 220. Many types or forms of fault-detection sessions may be implemented. For example, communication module 112 may establish a BFD session between physical interfaces 120 and 220. In one example, the BFD session may rely on and/or be supported by the OSPF and/or LACP protocols. Accordingly, communication module 112 may include and/or represent an OSPF and/or LACP module.

To facilitate establishing the fault-detection session, communication module 112 may pair virtual interfaces 122(1) and 222(1) via link 230. In some examples, communication module 112 may pair multiple virtual interfaces partitioned on physical interface 120 with multiple virtual interfaces partitioned on physical interface 220. For example, communication module 112 may pair virtual interfaces 122(1) and 222(1) via link 230 as well as virtual interfaces 122(N) and 222(N) via link 230.

In one example, communication module 112 may activate virtual interface 122(1) and/or virtual interface 222(1). By doing so, communication module 112 may set and/or configure virtual interface 122(1) and/or virtual interface 222(1) to serve as the active interface(s) within the fault-detection session. Additionally or alternatively, communication module 112 may deactivate virtual interface 122(N) and/or virtual interface 222(N). By doing so, communication module 112 may set and/or configure virtual interface 122(N) and/or virtual interface 222(N) to serve as the backup interface(s) within the fault-detection session. Such backup interfaces may be activated and/or brought online in the event that the corresponding active interfaces experience a failure that impairs communication. In other words, the backup interfaces may be activated and/or brought online when connectivity between the active interfaces is lost.

In some examples, the fault-detection session may implement and/or involve link aggregation technology. For example, communication module 112 may group the active virtual interface(s) and backup virtual interface(s) partitioned on physical interface 120 via the LACP protocol. In this example, communication module 112 may group the active virtual interface(s) and backup virtual interface(s) partitioned on physical interface 220 via the LACP protocol. These groupings may each serve as an aggregate link and/or a Link Aggregation Group (LAG).

In some examples, the fault-detection session may implement and/or involve Virtual Machines (VMs) and/or Virtual Extension Local Area Network (VXLAN) technology. For example, communication module 112 may create a VXLAN tunnel between a VXLAN tunnel endpoint at physical interface 120 and an additional VXLAN tunnel endpoint at physical interface 220. By doing so, physical interfaces 120 and 220 may be able to exchange hello packets via the VXLAN tunnel. Accordingly, receiving module 104 may receive hello packet 126 via the VXLAN tunnel endpoint as hello packet 126 arrives via the VXLAN tunnel.

In some examples, communication module 112 may set and/or configure the fault-detection session to initially operate in an asynchronous mode. In the asynchronous mode, physical interfaces 120 and 220 may exchange hello packets with one another on a periodic basis. The fault-detection session may, however, switch from the asynchronous mode to a demand mode under certain conditions. In the demand mode, physical interfaces 120 and 220 may exchange hello packets with one another on an as-needed basis, as opposed to a periodic basis. For example, in the demand mode, physical interfaces 120 and 220 may refrain from exchanging hello packets unless a certain event and/or condition occurs and/or is detected.

In some examples, communication module 112 may set and/or configure the fault-detection session to initially operate at the physical-interface level, as opposed to the virtual-interface level. When operating at the physical-interface level, the fault-detection session may call for physical interfaces 120 and 220 to exchange hello packets on behalf of their respective virtual interfaces. In contrast, when operating at the virtual-interface level, the fault-detection session may call for virtual interfaces 122(1)-(N) to exchange hello packets directly with virtual interfaces 222(1)-(N). Because the virtual-interface level may necessitate the exchange of individual hello packets for each pair of virtual interfaces, the physical-interface level may represent a more efficient, faster way to achieve fault or link-failure detection.

In some examples, the fault-detection session may operate at the physical-interface level until a link failure occurs and/or is detected. Accordingly, before a link failure occurs and/or is detected, physical interfaces 120 and 220 may exchange hello packets on behalf of their respective virtual interfaces. However, after such a link failure, the fault-detection session may begin operating at the virtual-interface level. In other words, once a link failure occurs and/or is detected, virtual interfaces 122(1)-(N) may start exchanging hello packets directly with virtual interfaces 222(1)-(N).

As a specific example, physical interface 220 of remote device 206 may identify, collect, and/or gather the statuses of virtual interfaces 222(1)-(N). Physical interface 220 may generate hello packet 126 that includes, within information 128, a set of virtual-interface indices that indicate whether virtual interfaces 222(1)-(N) are currently up or down. Physical interface 220 may then transmit hello packet 126 to physical interface 120 via link 230. As hello packet 126 arrives at physical interface 120, receiving module 104 may receive hello packet 126 and/or prepare the same for processing.

Returning to FIG. 3, at step 320 one or more of the systems described herein may identify, within the information included in the hello packet, a plurality of statuses that correspond to a plurality of virtual interfaces partitioned on the additional physical interface of the remote device. For example, identification module 106 may, as part of network device 202 and/or remote device 206 in FIG. 2, identify the current statuses of virtual interfaces 222(1)-(N) within information 128 included in hello packet 126. In one example, in the event that a certain virtual interface is currently reachable and functional, information 128 may identify that virtual interface as being up and/or online. However, in the event that a certain virtual interface is currently unreachable or nonfunctional, information 128 may identify that virtual interface as being down and/or offline.

The systems described herein may perform step 320 in a variety of ways and/or contexts. In some examples, identification module 106 may search hello packet 126 for control information. During this search, identification module 106 may identify information 128 within hello packet 126. As illustrated in FIG. 4, information 128 may include and/or identify various types and/or sections of information (in this example, the protocol version of hello packet 126, diagnostic codes for virtual interfaces 222(1)-(N), current communication states or conditions of virtual interfaces 222(1)-(N), control information for virtual interfaces 222(1)-(N), the packet size or length of hello packet 126, discriminator values for virtual interfaces 122(1)-(N) and 222(1)-(N), minimum receive or transmits intervals, status indicators for virtual interfaces 222(1)-(N), combinations of one or more of the same, and/or any other suitable information).

In one example, identification module 106 may identify a set of virtual-interface indices in information 128 in FIG. 4 (in this example, "|vf1|vf2|vf3| . . . "). In this example, the set of virtual-interface indices may correspond to and/or represent the statuses of virtual interfaces 222(1)-(N). These virtual-interface indices may indicate that some of virtual interfaces 222(1)-(N) are currently up or healthy while others are currently down or broken.

In one example, identification module 106 may identify the statuses of all virtual interfaces partitioned on physical interface 220. Additionally or alternatively, identification module 106 may identify the statuses of a subset (e.g., less than all) of the virtual interfaces partitioned on physical interface 220.

In one example, identification module 106 may identify, within information 128, a diagnostic code identifying and/or indicating a past action that previously led to the status of one of virtual interfaces 222(1)-(N) changing from down to up. Additionally or alternatively, the diagnostic code may specify the reason for the last change in BFD session state at physical interface 220 and/or one or more of virtual interfaces 222(1)-(N).

Returning to FIG. 3, at step 330 one or more of the systems described herein may determine, based at least in part on the statuses of the virtual interfaces, that the link supporting the fault-detection session established between the physical interface and the additional physical interface has experienced at least a partial failure. For example, determination module 108 may, as part of network device 202 and/or remote device 206 in FIG. 2, determine that link 230 supporting the fault-detection session established between physical interface 120 and physical interface 220 has experienced at least a partial failure. In this example, determination module 108 may arrive at and/or make this determination based at least in part on the statuses of virtual interfaces 222(1)-(N) as identified within information 128 of hello packet 126.

The systems described herein may perform step 330 in a variety of ways and/or contexts. In one example, determination module 108 may determine that one or more of virtual interfaces 222(1)-(N) have gone down. As a result, determination module 108 may determine link 230 has experienced at least a partial failure.

In one example, determination module 108 may determine that all of virtual interfaces 222(1)-(N) have gone down. As a result, determination module 108 may determine that link 230 has experienced a complete failure. In another example, determination module 108 may determine that only one of virtual interfaces 222(1)-(N) has gone down and the rest of virtual interfaces 222(1)-(N) remain up. As a result, determination module 108 may determine that link 230 has experienced a minor or partial failure.

In one example, determination module 108 may examine and/or analyze the diagnostic code identified in information 128 of hello packet 126. In this example, determination module 108 may determine that link 230 has experienced the failure based at least in part on this examination and/or analysis. In one embodiment, this analysis and/or examination may indicate and/or suggest that the link failure resulted from a software malfunction. Additionally or alternatively, this analysis and/or examination may indicate and/or suggest that the link failure resulted from a hardware malfunction. Determination module 108 may also determine and/or identify the underlying cause and/or source of the failure in accordance with the examination and/or analysis.

Returning to FIG. 3, at step 340 one or more of the systems described herein may perform a remedial action to address the at least partial failure of the link in response to the determination that the link has experienced the at least partial failure. For example, remedy module 110 may, as part of network device 202 and/or remote device 206 in FIG. 2, perform a remedial action to address the at least partial failure of link 230. In this example, remedy module 110 may initiate the remedial action in response to the determination that link 230 has experienced the at least partial failure.

The systems described herein may perform step 340 in a variety of ways and/or contexts. In one example, remedy module 110 may facilitate making a packet forwarding decision that accounts for the virtual interfaces that have gone down. For example, remedy module 110 may notify a routing engine of network device 202 that one or more of virtual interfaces 222(1)-(N) have gone down. In response to this notification, the routing engine may make a packet forwarding decision that accounts for those virtual interfaces that have gone down. As a result of this packet forwarding decision, the routing engine may reroute traffic from link 230 to an alternative link (not necessarily illustrated in FIG. 2) due at least in part to one or more of virtual interfaces 222(1)-(N) having gone down. Physical interface 120 may then forward traffic along the alternative link due at least in part to one or more of virtual interfaces 222(1)-(N) having gone down.

In one example, remedy module 110 may facilitate establishing a subsequent fault-detection session. For example, remedy module 110 may notify an OSPF and/or LACP module that one or more of virtual interfaces 222(1)-(N) have gone down. In response to this notification, the OSPF and/or LACP module may establish a subsequent fault-detection session between one or more of virtual interfaces 122(1)-(N) and other virtual interfaces partitioned on another remote physical interface.

In one example, remedy module 110 may facilitate switching from operating the BFD session at the physical-interface level to operating the BFD session at the virtual-interface level. For example, remedy module 110 may notify communication module 112 that one or more of virtual interfaces 222(1)-(N) have gone down. In response to this notification, communication module 112 may reconfigure and/or reprogram the BFD session such that virtual interfaces 122(1)-(N) and 222(1)-(N) exchange hello packets directly with one another instead of relying on physical interfaces 120 and 220 to relay the respective virtual-interface statuses. Additionally or alternatively, communication module 112 may switch the fault-detection session from asynchronous mode to demand mode such that subsequent hello packets are exchanged on an as-needed basis instead of a periodic basis.

In some examples, in the event that the link failure resulted from a software malfunction, remedy module 110 may attempt to fix the software malfunction. In one example, remedy module 110 may perform one or more reboot actions to resolve the software malfunction. For example, remedy module 110 may direct remote device 206 to power cycle physical interface 220. Additionally or alternatively, remedy module 110 may direct remote device 206 to power cycle itself and/or physical interface 220.

In some examples, remedy module 110 may notify an administrator that one or more of virtual interfaces 222(1)-(N) have gone down. In response to this notification, the administrator may do any number of things in an effort to fix the underlying reason that the virtual interfaces went down. For example, the administrator may reattach a physical component of link 230 to at least one of physical interfaces 120 and 220.

In some examples, remedy module 110 may attempt to address the underlying cause of the link failure by redoing the same action that previously led the failed virtual interface(s) to return from down to up. For example, remedy module 110 may select the past action indicated by the diagnostic code identified within information 128. In this example, remedy module 110 may repeat the same action indicated by the diagnostic code in an effort to fix the underlying cause of the link failure.

Although many of the foregoing methods are described from the perspective of network device 202, remote device 206 may perform the same methods in connection with the fault-detection session. For example, one or more of modules 102 may cause remote device 206 to (1) receive, via physical interface 220, a hello packet that includes information specific to a fault-detection session established between physical interface 120 and physical interface 220 via link 230, (2) identify, within the information included in the hello packet, a plurality of statuses that correspond to virtual interfaces 122(1)-(N) partitioned on physical interface 120, (3) determine, based at least in part on the statuses of virtual interfaces 122(1)-(N), that link 230 supporting the fault-detection session established between physical interface 120 and physical interface 220 has experienced at least a partial failure, and then (4) perform a remedial action to address the at least partial failure of link 230 in response to determining that link 230 has experienced the at least partial failure.

Figure 6:
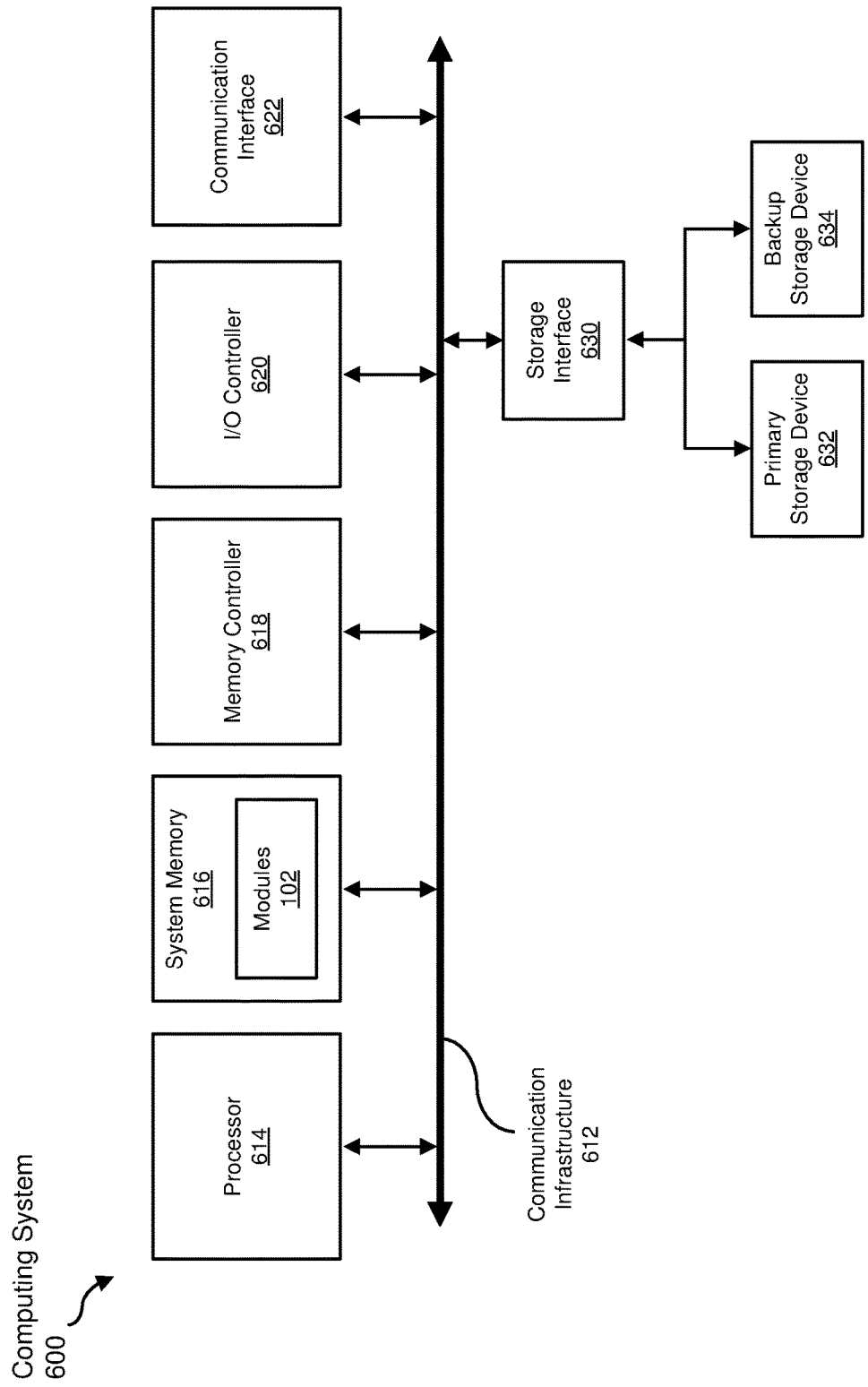
FIG. 6 is a block diagram of an exemplary computing system capable of implementing and/or being used in connection with one or more of the embodiments described and/or illustrated herein.

FIG. 6 is a block diagram of an exemplary computing system 600 capable of implementing and/or being used in connection with one or more of the embodiments described and/or illustrated herein. In some embodiments, all or a portion of computing system 600 may perform and/or be a means for performing, either alone or in combination with other elements, one or more of the steps described in connection with FIG. 3. All or a portion of computing system 600 may also perform and/or be a means for performing and/or implementing any other steps, methods, or processes described and/or illustrated herein.

Computing system 600 broadly represents any type or form of electrical load, including a single or multi-processor computing device or system capable of executing computer-readable instructions. Examples of computing system 600 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 600 may be programmed, configured, and/or otherwise designed to comply with one or more networking protocols. According to certain embodiments, computing system 600 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 600 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 600 may include various network and/or computing components. For example, computing system 600 may include at least one processor 614 and a system memory 616. Processor 614 generally represents any type or form of processing unit capable of processing data or interpreting and executing instructions. For example, processor 614 may represent an application-specific integrated circuit (ASIC), a system on a chip (e.g., a network processor), a hardware accelerator, a general purpose processor, and/or any other suitable processing element.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 600 may include both a volatile memory unit (such as, for example, system memory 616) and a non-volatile storage device (such as, for example, primary storage device 632, as described in detail below). System memory 616 may be implemented as shared memory and/or distributed memory in a network device.

Furthermore, system memory 616 may store packets and/or other information used in networking operations.

In certain embodiments, exemplary computing system 600 may also include one or more components or elements in addition to processor 614 and system memory 616. For example, as illustrated in FIG. 6, computing system 600 may include a memory controller 618, an Input/Output (I/O) controller 620, and a communication interface 622, each of which may be interconnected via communication infrastructure 612. Communication infrastructure 612 generally represents any type or form of infrastructure capable of facilitating communication between one or more components of a computing device. Examples of communication infrastructure 612 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 618 generally represents any type or form of device capable of handling memory or data or controlling communication between one or more components of computing system 600. For example, in certain embodiments memory controller 618 may control communication between processor 614, system memory 616, and I/O controller 620 via communication infrastructure 612. In some embodiments, memory controller 618 may include a Direct Memory Access (DMA) unit that may transfer data (e.g., packets) to or from a link adapter.

I/O controller 620 generally represents any type or form of device or module capable of coordinating and/or controlling the input and output functions of a computing device. For example, in certain embodiments I/O controller 620 may control or facilitate transfer of data between one or more elements of computing system 600, such as processor 614, system memory 616, communication interface 622, and storage interface 630.

Communication interface 622 broadly represents any type or form of communication device or adapter capable of facilitating communication between exemplary computing system 600 and one or more additional devices. For example, in certain embodiments communication interface 622 may facilitate communication between computing system 600 and a private or public network including additional computing systems. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between computing system 600 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also enable computing system 600 to engage in distributed or remote computing. For example, communication interface 622 may receive instructions from a remote device or send instructions to a remote device for execution.

As illustrated in FIG. 6, exemplary computing system 600 may also include a primary storage device 632 and/or a backup storage device 634 coupled to communication infrastructure 612 via a storage interface 630. Storage devices 632 and 634 generally represent any type or form of storage device or medium capable of storing data and/or other computer-readable instructions. For example, storage devices 632 and 634 may represent a magnetic disk drive (e.g., a so-called hard drive), a solid state drive, a floppy disk drive, a magnetic tape drive, an optical disk drive, a flash drive, or the like. Storage interface 630 generally represents any type or form of interface or device for transferring data between storage devices 632 and 634 and other components of computing system 600.

In certain embodiments, storage devices 632 and 634 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 634 may also include other similar structures or devices for allowing computer software, data, or other computer-readable instructions to be loaded into computing system 600. For example, storage devices 632 and 634 may be configured to read and write software, data, or other computer-readable information. Storage devices 632 and 634 may be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from those shown in FIG. 6. Computing system 600 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   receiving, at a physical interface of a network device, a hello packet that includes information specific to a fault-detection session established between the physical interface and an additional physical interface of a remote device via a link;
   identifying, within the information included in the hello packet, a plurality of statuses that correspond to a plurality of virtual interfaces partitioned on the additional physical interface of the remote device;
   determining, based at least in part on the statuses of the virtual interfaces, that the link supporting the fault-detection session established between the physical interface and the additional physical interface has experienced at least a partial failure;
   identifying, within the information included in the hello packet, a diagnostic code indicating a past action that previously led to a status of one of the virtual interfaces changing from down to up;
   determining, based at least in part on the diagnostic code identified in the hello packet, that the link experienced the at least partial failure due at least in part to a software malfunction;
   selecting at least one remedial action that addresses the at least partial failure of the link and fixes the software malfunction that caused the link to experience the at least partial failure based at least in part on the past action indicated by the diagnostic code identified within the information included in the hello packet; and
   performing the remedial action to address the at least partial failure of the link and fix the software malfunction that caused the link to experience the at least partial failure.

2. The method of claim 1, wherein:
   determining that the link has experienced the at least partial failure comprises determining that one of the virtual interfaces partitioned on the additional physical interface is down; and
   wherein the remedial action performed to address the at least partial failure of the link comprises at least one of:
      making a packet forwarding decision that accounts for the one of the virtual interfaces being down;
      establishing a subsequent fault-detection session;
      switching from exchanging hello packets via the physical interface and the additional physical interface to exchanging hello packets via a virtual interface partitioned on the physical interface and the one of the virtual interfaces partitioned on the additional physical interface;
      power cycling the additional physical interface on which the virtual interfaces are partitioned;
      power cycling the remote device that includes the additional physical interface; and
      notifying an administrator of a status of the one of the virtual interfaces.

3. The method of claim 2, wherein making the packet forwarding decision comprises:
   rerouting traffic from the link to an alternative link due at least in part to the one of the virtual interfaces being down; and
   forwarding the traffic along the alternative link due at least in part to the traffic having been rerouted.

4. The method of claim 1, wherein identifying the statuses of the virtual interfaces comprises identifying the statuses of all virtual interfaces partitioned on the additional physical interface; and
   upon identifying the statuses of all the virtual interfaces partitioned on the additional physical interface, switching the fault-detection session from an asynchronous mode to a demand mode such that subsequent hello packets are exchanged between the physical interface and the additional physical interface on an as-needed basis instead of a periodic basis.

5. The method of claim 1, further comprising establishing the fault-detection session between the physical interface and the additional physical interface by:

pairing an active virtual interface partitioned on the physical interface with an active virtual interface partitioned on the additional physical interface via the link;

pairing a backup virtual interface partitioned on the physical interface with a backup virtual interface partitioned on the additional physical interface; and wherein:

determining that the link has experienced the at least partial failure comprises determining that the link supporting the paired active virtual interfaces of the fault-detection session has gone down; and performing the remedial action to address the at least partial failure of the link comprises:

deactivating the paired active virtual interfaces of the fault-detection session; and activating the paired backup virtual interfaces of the fault-detection session.

6. The method of claim 5, further comprising:

grouping, via a Link Aggregation Control Protocol (LACP), the active virtual interface and the backup virtual interface partitioned on the physical interface as an aggregate interface;

grouping, via the LACP, the active virtual interface and the backup virtual interface partitioned on the additional physical interface as an additional aggregate interface; and wherein activating the paired backup virtual interfaces of the fault-detection session comprises notifying an LACP module that the link supporting the paired active virtual interfaces of the fault-detection session has gone down to enable the LACP module to activate the paired backup virtual interfaces of the fault-detection session.

7. The method of claim 1, further comprising establishing the fault-detection session between the physical interface and the additional physical interface by creating a Virtual Extensible Local Area Network (VXLAN) tunnel between a VXLAN tunnel endpoint at the physical interface and an additional VXLAN tunnel endpoint at the additional physical interface; and wherein receiving the hello packet via the physical interface of the network device comprises receiving the hello packet via the VXLAN tunnel endpoint at the physical interface of the network device.

8. The method of claim 1, further comprising establishing the fault-detection session between the physical interface and the additional physical interface such that:

hello packets are exchanged between the physical interface and the additional physical interface until a link failure is detected in connection with the fault-detection session; and once a link failure is detected in connection with the fault-detection session, hello packets are exchanged between a virtual interface partitioned on the physical interface and one of the virtual interfaces partitioned on the additional physical interface.

9. A system comprising:

at least one memory device;

a receiving module, stored in the at least one memory device, that receives, at a physical interface of a network device, a hello packet that includes information specific to a fault-detection session established between the physical interface and an additional physical interface of a remote device via a link;

an identification module, stored in the at least one memory device, that:

identifies, within the information included in the hello packet, a plurality of statuses that correspond to a plurality of virtual interfaces partitioned on the additional physical interface of the remote device; and identifies, within the information included in the hello packet, a diagnostic code indicating a past action that previously led to a status of one of the virtual interfaces changing from down to up;

a determination module, stored in the at least one memory device, that:

determines, based at least in part on the statuses of the virtual interfaces, that the link supporting the fault-detection session established between the physical interface and the additional physical interface has experienced at least a partial failure; and determines, based at least in part on the diagnostic code identified in the hello packet, that the link experienced the at least partial failure due at least in part to a software malfunction;

a remedy module, stored in the at least one memory device, that:

selects at least one remedial action that addresses the at least partial failure of the link and fixes the software malfunction that caused the link to experience the at least partial failure based at least in part on the past action indicated by the diagnostic code identified within the information included in the hello packet; and performs the remedial action to address the at least partial failure of the link and fix the software malfunction that caused the link to experience the at least partial failure in response to the determination that the link has experienced the at least partial failure; and at least one physical processor that executes the receiving module, the identification module, the determination module, and the remedying module.

10. The system of claim 9, wherein:

the determination module determines that one of the virtual interfaces partitioned on the additional physical interface is down; and wherein the remedial action performed to address the at least partial failure of the link comprises at least one of:

making a packet forwarding decision that accounts for the one of the virtual interfaces being down;

establishing a subsequent fault-detection session;

switching from exchanging hello packets via the physical interface and the additional physical interface to exchanging hello packets via a virtual interface partitioned on the physical interface and the one of the virtual interfaces partitioned on the additional physical interface;

power cycling the additional physical interface on which the virtual interfaces are partitioned;

power cycling the remote device that includes the additional physical interface; and notifying an administrator of the status of the one of the virtual interfaces.

11. The system of claim 10, wherein to make the packet forwarding decision, the remedy module facilitates:

rerouting traffic from the link to an alternative link due at least in part to the one of the virtual interfaces being down; and forwarding the traffic along the alternative link due at least in part to the traffic having been rerouted.

12. The system of claim 9, wherein:

the identification module identifies the statuses of all virtual interfaces partitioned on the additional physical interface; and the remedy module switches the fault-detection session from an asynchronous mode to a demand mode such that subsequent hello packets are exchanged between the physical interface and the additional physical interface on an as-needed basis instead of a periodic basis.

13. The system of claim 9, further comprising a communication module, stored in the at least one memory device, that establishes the fault-detection session between the physical interface and the additional physical interface by:
pairing an active virtual interface partitioned on the physical interface with an active virtual interface partitioned on the additional physical interface via the link; and
pairing a backup virtual interface partitioned on the physical interface with a backup virtual interface partitioned on the additional physical interface; and
wherein:
the determination module determines that the link supporting the paired active virtual interfaces of the fault-detection session has gone down; and
to perform the remedial action, the remedy module:
deactivates the paired active virtual interfaces of the fault-detection session; and
activates the paired backup virtual interfaces of the fault-detection session.

14. The system of claim 13, wherein the communication module:
groups, via a Link Aggregation Control Protocol (LACP), the active virtual interface and the backup virtual interface partitioned on the physical interface as an aggregate interface;
groups, via the LACP, the active virtual interface and the backup virtual interface partitioned on the additional physical interface as an additional aggregate interface; and
notifies an LACP module that the link supporting the paired active virtual interfaces of the fault-detection session has gone down to enable the LACP module to activate the paired backup virtual interfaces of the fault-detection session.

15. The system of claim 9, further comprising a communication module, stored in the at least one memory device, that establishes the fault-detection session between the physical interface and the additional physical interface by creating a Virtual Extensible Local Area Network (VXLAN) tunnel between a VXLAN tunnel endpoint at the physical interface and an additional VXLAN tunnel endpoint at the additional physical interface; and
wherein the receiving module receives the hello packet via the VXLAN tunnel endpoint at the physical interface of the network device.

16. An apparatus comprising:
a physical interface of a network device that is communicatively coupled to an additional physical interface of a remote device via a link;
at least one physical processor communicatively coupled to the physical interface of the network device, wherein the physical processor is to:
receive, at the physical interface, a hello packet that includes information specific to a fault-detection session established between the physical interface and the additional physical interface of the remote device via the link;
identify, within the information included in the hello packet, a plurality of statuses that correspond to a plurality of virtual interfaces partitioned on the additional physical interface of the remote device;
determine, based at least in part on the statuses of the virtual interfaces, that the link supporting the fault-detection session established between the physical interface and the additional physical interface has experienced at least a partial failure;
identify, within the information included in the hello packet, a diagnostic code indicating a past action that previously led to a status of one of the virtual interfaces changing from down to up;
determine, based at least in part on the diagnostic code identified in the hello packet, that the link experienced the at least partial failure due at least in part to a software malfunction;
select at least one remedial action that addresses the at least partial failure of the link and fixes the software malfunction that caused the link to experience the at least partial failure based at least in part on the past action indicated by the diagnostic code identified within the information included in the hello packet; and
perform the remedial action to address the at least partial failure of the link and fix the software malfunction that caused the link to experience the at least partial failure in response to determining that the link has experienced the at least partial failure.

* * * * *